March 26, 1963 H. R. YOUNG 3,082,650
DEPTH CONTROL MECHANISM FOR DRILLING MACHINES
Filed Sept. 12, 1960
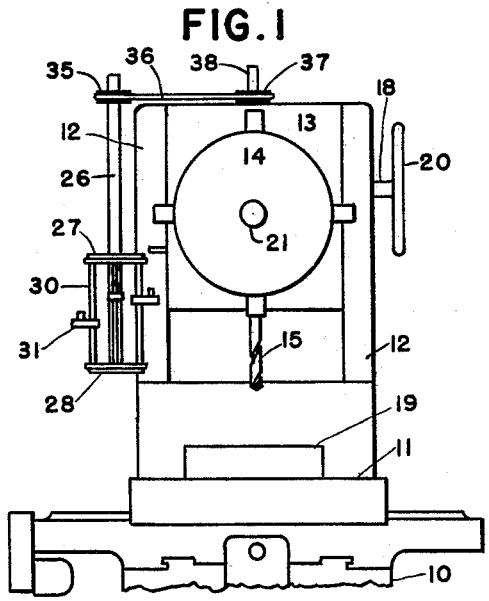
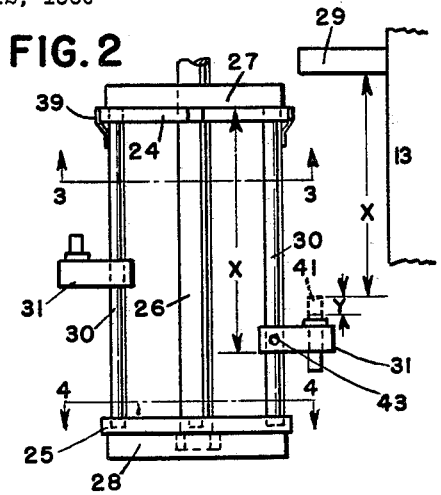
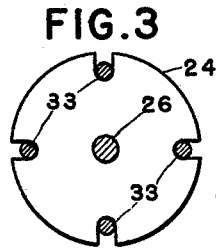
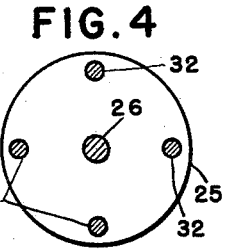
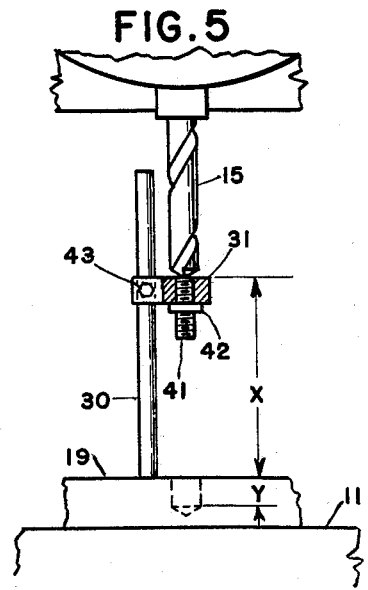
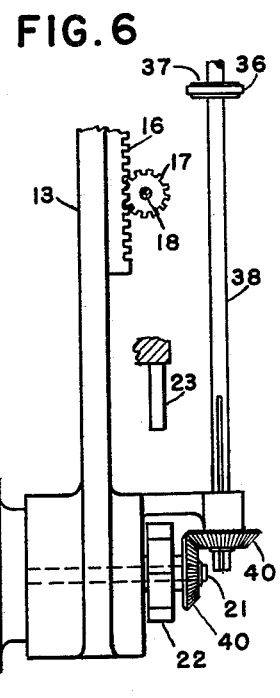
INVENTOR.
HARRY RUSSELL YOUNG
BY
Robert M. Barr

United States Patent Office 3,082,650
Patented Mar. 26, 1963

3,082,650
DEPTH CONTROL MECHANISM FOR
DRILLING MACHINES
Harry Russell Young, 717 Braeburn St., Narberth, Pa.
Filed Sept. 12, 1960, Ser. No. 55,394
4 Claims. (Cl. 77—25)

The present invention relates to a machine of the turret type, wherein a plurality of tools for respectively drilling, tapping, reaming or otherwise are successively operated, and more particularly to a novel means for stopping the feeding of a tool when it reaches a predetermined depth in the work piece.

In machines of the type to which the invention relates it has been heretofore proposed to provide a unit wherein a plurality of adjustable limit stops, one for each tool are mounted in the machine in a position to be engaged by the downwardly moving slide which carries the tool turret. Such an assembly is shown in U.S. Patent No. 2,776,584 but like others for the same purpose has to be located in an elevated location remote from the working area of the tool. Therefore it is not only difficult to reach the stops for adjustment but a time consuming operation to make the required precise micrometer setting of the stop members.

An object of the invention is to provide an apparatus for setting depth control stops wherein the disadvantages above noted are overcome.

Another object is to provide an apparatus operating in conjunction with a mounted tool for setting a gauge stop member before it is mounted in its overhead holder or stop control unit.

A further object is to provide a stop limit member for the travel of a tool in a turret machine wherein one or more stop members are removably mounted in a holder in association with an apparatus operating in conjunction with a mounted work tool to set a stop member for precision travel of the tool into a work-piece to a predetermined depth.

Other objects will appear hereinafter.

In the accompanying drawings:

FIG. 1 is a front elevation view of a turret type drilling machine showing one form tool depth limit means of the invention;

FIG. 2 is a side elevation view, on an enlarged scale, of the depth setting unit positioned beside the tool slide showing the gauge pin set for depth and in dotted lines the pin as projected prior to setting;

FIG. 3 is a section view on line 3—3 of FIG. 2;

FIG. 4 is a section view on line 4—4 of FIG. 2;

FIG. 5 is an enlarged detail elevation view showing a limit stop member in association with a mounted drill for initial setting; and FIG. 6 is a detail side elevation viewing showing the common drive for the tool head and depth control unit.

Referring to the drawings FIG. 1 illustrates one type of machine with the depth control unit of the invention, such machine being a multiple head turret one comprising a base 10 with a work supporting tabe 11 with rising standards 12 forming a guide way for a slide 13. This slide assembly includes a rotatable head 14 for mounting a plurality of radially disposed tools 15 in peripherally spaced positions. Such tools can be drills, taps, or reamers. Conventionally the tools are driven by a suitable source of power brought into operation when a tool is in work position. An understanding of the invention does not require a detailed description of the power transmitting assembly.

In the present instance the slide 13 is manually raised and lowered by means of a rack 16 attached thereto and in mesh with a worm 17 keyed to the shaft 18 for rotation by a hand wheel 20. Also journalled in the slide 13 is a shaft 21 to which the head 14 is keyed for bringing selected tools into working position. The shaft 21 projects rearwardly of the slide 13 to mount a ratchet wheel 22 which travels in a path to strike a fixed abutment 23 on the machine frame to angularly shift the head 14 and thereby bring another tool into operating position.

In order to stop the downward travel of the slide 13 when the tool has entered the work piece 19 to the predetermined depth, a novel control unit is mounted upon the machine frame adjacent to the path of the slide 13, such unit comprising two heads 24 and 25 spaced as parts of a vertical tubular spindle 26, this assembly being supported between two brackets 27 and 28 attached to and projecting from the frame. Thus the assembly is in the form of a holder for supporting a plurality of rods 30 in vertical parallel relation and angularly spaced peripherally to match the angular spacing of the tools. Each rod 30 carries a laterally projecting slide limit finger 31, which is axially adjustable for setting as a gauge to define a predetermined depth travel of the tool into a work piece. In this connection it should be noted that any positioned finger 31 lies in the path of a limit stop 29 projecting from the edge of the slide 13.

For removably mounting the rods 30, the lower head 25 has a plurality of bores 32 peripherally spaced to correspond to the angular spacing of the tools in the rotary head 14, and respectively forming seats for the lower ends of the rods 30. Likewise the upper head 24 has bores 33 respectively aligned with the bores 32 but in addition each bore opens outwardly to permit free passage of a rod 30 into its position as a unitary part of the control unit. Adjacent each bore 33 there is a spring clip 39 for locking each rod 30 in place with its finger 31 properly set for depth limit.

For synchronizing the step-by-step rotation of the control unit with the step-by-step rotation of the tool head 14, the projecting end of the spindle 26 has a pulley 35 keyed thereon and driven by a belt 36 from a pulley 37 on a vertical splined shaft 38. This shaft 38 is driven from the shaft 21 by a pair of meshing bevel gears 40 as will be understood. The spindle 26 and the shaft 38 are respectively journalled in suitable bearings As a means for precision setting the respective fingers 31 for engagement by the slide stop 29, at the predetermined depth penetration of the tool into the work piece 19, each finger 31 has a gauge pin 41, threaded vertically therethrough to project at one end to receive a lock nut 42. The set projection of the pin 41 defines the selected distance the tool enters the work piece 19.

In order to coordinate this setting with a tool in working position in the head 14, a rod 30, is removed from the control holder and seated upon the work piece 19 with its finger 31 below the opposed end of the tool. In this position the upper end of the gauge pin 41 is flush with the upper face of the finger 31. The finger 31 is now moved axially upward on the rod 30 into contact with the tool whereupon the set screw 43 then locks the finger to the rod. This the set length X of the finger 31 from the lower end of the rod represents the length the slide 13 and its tool 15 have to travel to bring the tool into contact with the work piece 19. The rod with its set finger is now turned upside down to bring the gauge pin 41 into an upwardly disposed position where it is now axially adjusted downwardly until its protruding upper end corresponds to the depth Y selected for the tool travel. With the pin 41 precision located its locking nut 42 is tightened to maintain the set position. As so set the rod 30 is now replaced in the control holder and the gauge pin is in position to serve as a limit for the downward travel of the stop 29 and the slide 13. Also it should be noted that since the pin 41 has been reversed the length of travel of the stop 29 has been increased by the overall length of the pin 41 thereby permitting the tool to travel into the work piece by the distance Y the gauge pin 41 projects upwardly from its finger.

While the foregoing describes the setting of one rod only it should be understood that in practice all of the rods 26 are removed from the holder and set one at a time as the succession of turret mounted tools is brought into position above the work piece. When all of the rod fingers have been set, the rods are replaced in the holder, where each becomes the mate of a particular tool. Now as the holder rotates synchronously with the turret, the set rods are respectively located with its gauge pin in the path of the slide stop. Thus multiple handling and setting of the rods represent an appreciable saving of time and labor costs.

Reviewing generally the assembly of the gauge pin 41 so that the plurality of rods for a multiple turrent head are coordinated, all such pins have the same constant length and each is initially threaded into its finger until its upper end is flush with the face of the finger 31, while its lower end projects to finally be adjusted for the selected depth limit. As shown in FIG. 5, the finger 31 has been moved up on the rod 30 into contact with the tool 15 and set to thereby define the distance "X" by which the tool has to travel to contact the work-piece. Since the pin 41 has a predetermined length, the distance "X" between the stop 29 and the upwardly projected end of the pin will always define the travel of the tool to the workpiece. In the turret unit with a plurality of set gauge pins, this predetermined length is a constant. Pin 41 is shown in FIG. 2 in dotted lines to indicate the "X" distance and in full lines as set for depth.

Since there are a plurality of rods for the holder, each has to be set for the related tool and the distance "X" becomes a variable. For example, in FIGS. 2 and 5 the "X" distance is assumed to be ten inches for tool No. 1 so the stop has to travel ten inches to bring the tool to work-piece contacting position. Assuming "X" is six inches for tool No. 2, then the top of the gauge pin is four inches closer to the stop 29 so the latter would travel six inches. The stop 29 now continues its travel for the set depth limit indicated by "Y." The depth setting of the pin is micromatic for precision setting.

It will now be apparent that a complete unitary tool slide control has been devised wherein a depth control unit can be located remote from the working area of the tool and generally inaccessible for precision setting while, according to the invention, the precision setting of the depth limit travel of the tool is made independent of the location of such a control unit, as well as the unit itself.

Having now described my invention I claim:

1. The method of setting a depth gauge which consists in feeding a gauge pin through a finger to project at one end, mounting said finger upon a rod seating the rod vertically upon a work piece with said pin juxaposed to said piece, axially moving the finger on said rod into contact with a depending tool, setting the finger as a measure of tool travel to the work piece, inverting and tranferring the rod to a holder, to position the gauge pin in the path of a stop on a tool carrying slide and setting the pin to the selected depth travel of the tool.

2. The method of setting a depth gauge for a drilling machine which consists in attaching an axially adjustable gauge pin to a finger to project therefrom, mounting said finger on a rod for lengthwise positioning, seating the rod on a work-piece with said pin projecting downwardly toward said piece, axially moving said finger into contact with a depending tool as a measure of tool travel to the work-piece, setting said finger in contact position, removing and inverting said rod, adjusting said gauge pin to project above said finger to define the selected depth drilling, and mounting the depth set rod adjacent a drilling machine to position the set gauge pin in the path of a stop in a tool carrying slide.

3. A depth control unit for a machine having a reciprocable slide, a tool carried by and depending from side slide, and a stop projecting from said slide, comprising a rod, a finger axially adjustable on said rod and projecting laterally therefrom, said rod being adapted to seat vertically upon a work-piece with said finger below said tool for movement to contact therewith, means to set said finger in contact position to define the travel of the tool by the work-piece, a gauge pin axially adjustable on said finger and projecting downwardly towards said work-piece, said rod with said set slide adapted to be removed from said work-piece and inverted to position said gauge pin projecting upwardly, means for locking said gauge when projecting the selected depth limit, a holder, means mounting said rod in said holder, and means to position said holder with said gauge pin below and in the path of said slide stop.

4. A depth setting unit according to claim 3, wherein a plurality of set rods are mounted in the holder and all gauge pins having the same length.

References Cited in the file of this patent
UNITED STATES PATENTS

| 971,679 | Kirby | Oct. 4, 1910 |
| 2,915,923 | Burg | Dec. 8, 1959 |